United States Patent [19]

Morikita

[11] Patent Number: 5,472,335
[45] Date of Patent: Dec. 5, 1995

[54] LOCALLY PRESSURIZING TYPE INJECTION MOLDING MACHINE

[75] Inventor: Nobuo Morikita, Chiba, Japan

[73] Assignee: Sumitomo Heavy Industries, Ltd., Japan

[21] Appl. No.: 128,226

[22] Filed: Sep. 29, 1993

[30] Foreign Application Priority Data

Oct. 7, 1992 [JP] Japan .................................. 4-268554

[51] Int. Cl.$^6$ .................................. B29C 45/40
[52] U.S. Cl. ........................ 425/556; 264/71; 264/334; 425/424; 425/432; 425/444
[58] Field of Search .................................. 425/556, 432, 425/444, 424, 431; 264/71, 334

[56] References Cited

U.S. PATENT DOCUMENTS

| 3,893,644 | 7/1975 | Drazick | 425/444 |
| 5,405,259 | 4/1995 | Morikita | 425/556 |

FOREIGN PATENT DOCUMENTS

| 2614213 | 10/1977 | Germany . |
| 3232893 | 6/1983 | Germany . |
| 63-288724 | 11/1988 | Japan . |
| 4-128020 | 4/1992 | Japan .................................. 425/444 |
| 4369517 | 12/1992 | Japan . |

OTHER PUBLICATIONS

Patent Abstracts of Japan vol. 13, No. 100 9 Mar. 89.

Primary Examiner—Jay H. Woo
Assistant Examiner—Joseph Leyson
Attorney, Agent, or Firm—Lorusso & Loud

[57] ABSTRACT

A locally pressurizing type injection molding machine includes a stationary die and a movable die. An ejector pin extends through the movable die, with its tip end facing a mold cavity and its trailing end fixed by an ejector plate. A vibrating/pressurizing pin extends through the movable die and the ejector plate, with its tip end facing a resin passage and with its trailing end fixed by the vibrating/pressurizing plate. A vibrating/pressurizing actuator is disposed in rear of the vibrating/pressurizing plate, so that the vibrating/pressurizing can be effected through the vibrating/pressurizing plate, and the ejector pin can be advanced through the vibrating/pressurizing plate and the ejector plate, both by operation of the vibrating/pressurizing actuator.

4 Claims, 4 Drawing Sheets

(a) MOLDING STATE
(b) PUNCH VIBRATION
(c) VIBRATION PUNCHING

LOCALLY PRESSURIZING TYPE INJECTION MOLDING MACHINE

BACKGROUND OF THE INVENTION

1. Field of the Invention

The present invention relates to a locally pressurizing type injection molding machine.

2. Description of the Prior Art

Conventional locally pressurizing type injection molding machines pressurize a local portion of a resin within a cavity, thereby eliminating the need for the boring of a thin plate, the finishing of a cut surface or the like.

FIG. 1 is a view illustrating operation of the prior art locally pressurizing type injection molding machine. FIG. 1(a) illustrates a molding step; FIG. 1(b) illustrates a punch vibrating step; and FIG. 1(c) illustrates a vibration punching step.

Referring to FIG. 1, the prior art locally pressurizing type injection molding machine comprises a stationary die 1 mounted on a stationary platen, a movable die 2 mounted on a movable platen (not shown), a cavity 3 defined between the stationary and movable dies 1 and 2, a sprue 4 through which a resin is injected from an injection nozzle (not shown), a gate 5 located between the sprue 4 and the cavity 3, a stationary punch 6 disposed on the stationary die 1, and a movable punch 7 disposed on the movable die 2.

The stationary and movable punches 6 and 7 are vibrated by vibrating devices (not shown) disposed within the stationary and movable dies 1 and 2, respectively, during a cooling step which follows the completion of a pressure maintaining step in an injection molding cycle. The stationary and movable punches 6 and 7 are previously disposed at locations where they contact a portion of a molding and hence, as shown in FIG. 1(a), heat due to shear stress is generated in such portion (e.g., a boring portion or a gate 5) between the stationary and movable punches 6 and 7 by vibration of the movable punch 7, thereby softening the resin.

When the movable punch 7 is pushed out to the right, as shown in FIG. 1(b), while vibrating the stationary and movable punches 6 and 7, the softened resin is cut, as shown in FIG. 1(c). In this case, the cut along the movable punch 7 is finished and cooled by the vibration, thereby providing a glossy worked surface of a high accuracy.

In the above prior art locally pressurizing type injection molding machine, a molded product is ejected from the movable die 2 by an ejector device (not shown). Accommodation of an actuator or actuators for the stationary and movable punches 6 and 7 in addition to the ejector device, results in a complicated structure and an increase in size of the injection molding machine.

SUMMARY OF THE INVENTION

It is an object of the present invention to provide a locally pressurizing type injection molding machine, wherein the problems associated with the prior art locally pressurizing type injection molding machine are overcome, so as to provide an uncomplicated structure and to minimize the size of the machine.

To achieve the above object, according to the present invention, there is provided a locally pressurizing type injection molding machine comprising a stationary die, a movable die disposed for movement into and out of contact with the stationary die to define a cavity therebetween, an ejector pin extendable through the movable die and having a tip end facing the cavity, an ejector plate for fixing a trailing end of the ejector pin, a vibrating/pressurizing pin extendable through the movable die and the ejector plate and having a tip end facing into a resin passage in communication with the mold cavity, a vibrating/pressurizing plate which fixes a trailing end of the vibrating/pressurizing pin and is selectively brought to bear against the ejector plate, and a vibrating/pressurizing actuator disposed in rear of the vibrating/pressurizing plate for advancing and retracting the vibrating/pressurizing plate.

With the above construction, the vibrating/pressurizing pin can be advanced through the vibrating/pressurizing plate, and the ejector pin can be advanced through the vibrating/pressurizing plate and the ejector plate, both by operation of the vibrating/pressurizing actuator.

In addition, the need for a separate hydraulic cylinder for actuating the ejector pin is eliminated, leading to a simplified structure and a reduced size of the injection molding machine.

Further, a vibrating spring biases the vibrating/pressurizing plate toward the retracted position, thereby ensuring that when the ejection of the molded product by the ejector pin has been completed, the vibrating/pressurizing plate can be returned to its initial position at the ejection step.

A floating sleeve may be slidably disposed to extend through the movable die, and the vibrating spring may be disposed between the vibrating/pressurizing plate and the floating sleeve.

The above and other objects, features and advantages of the invention will become apparent from a consideration of the following description of the preferred embodiment taken in conjunction with the accompanying drawings.

DESCRIPTION OF PREFERRED EMBODIMENTS

The present invention will now be described by way of a preferred embodiment in connection with the accompanying drawings.

Figure 1:
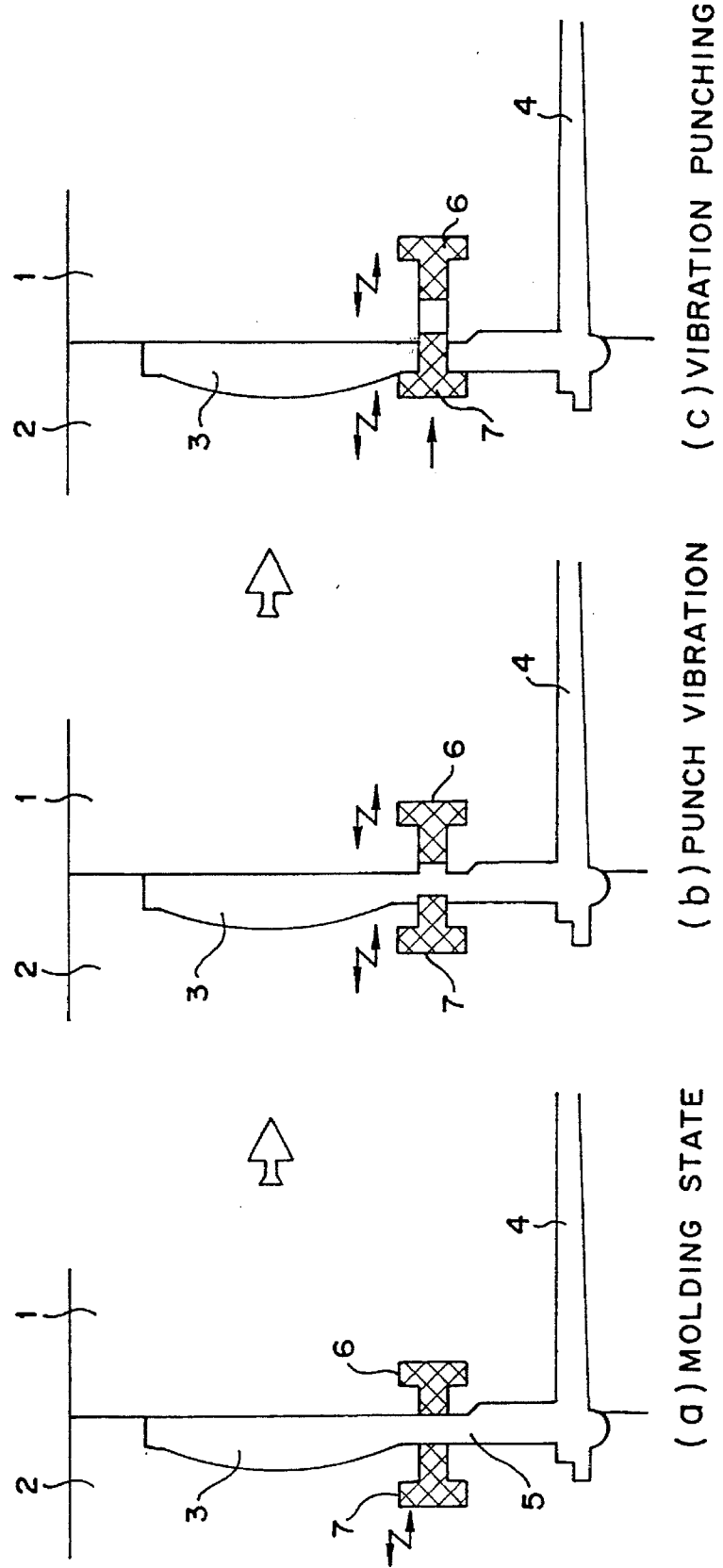
FIG. 1 is a schematic view illustrating 3 steps in operation of a prior art locally pressurizing type injection molding machine.
Figure 2:
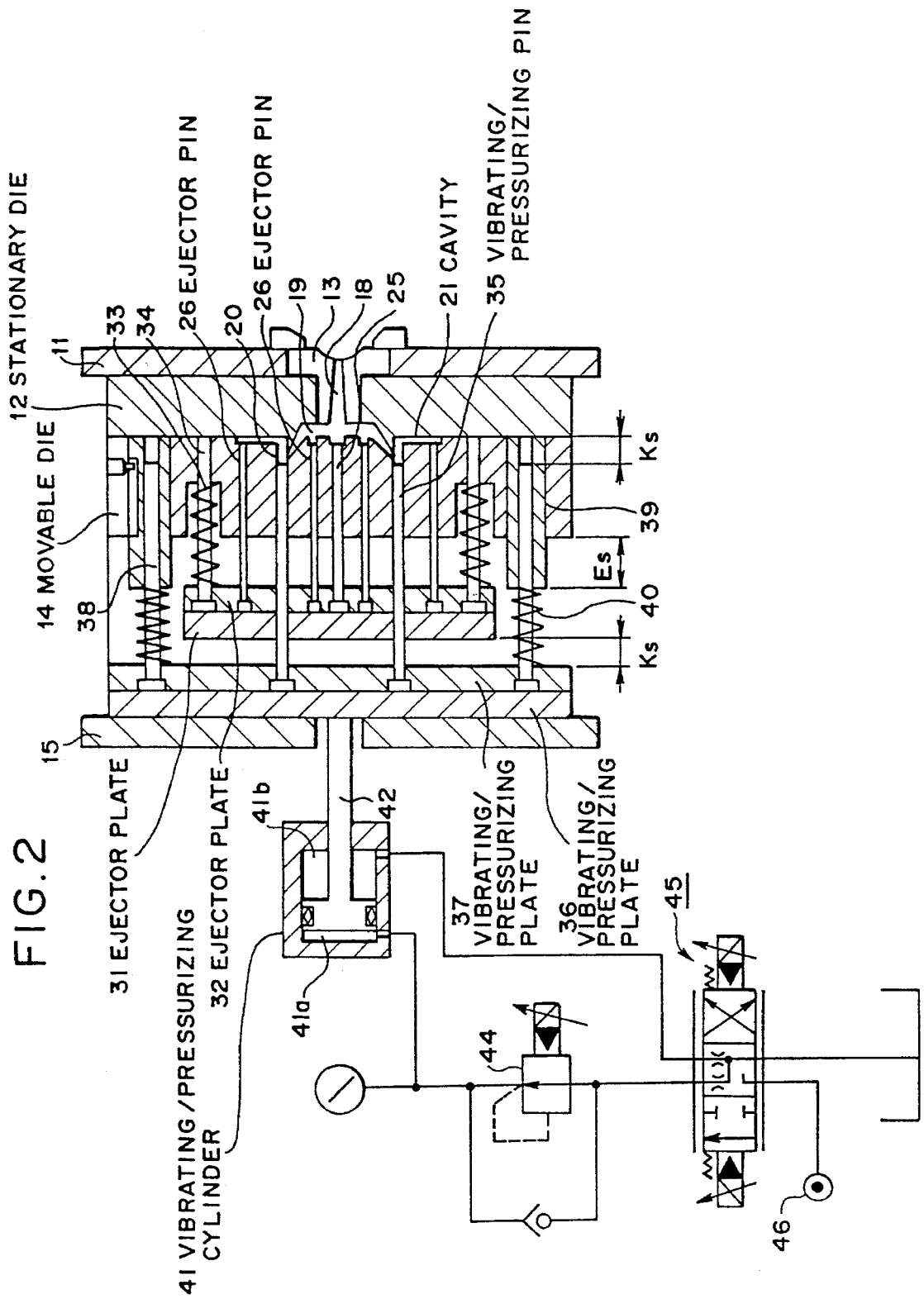
FIG. 2 is a sectional view of a locally pressurizing type injection molding machine according to a preferred embodiment of the present invention.
Figure 3:
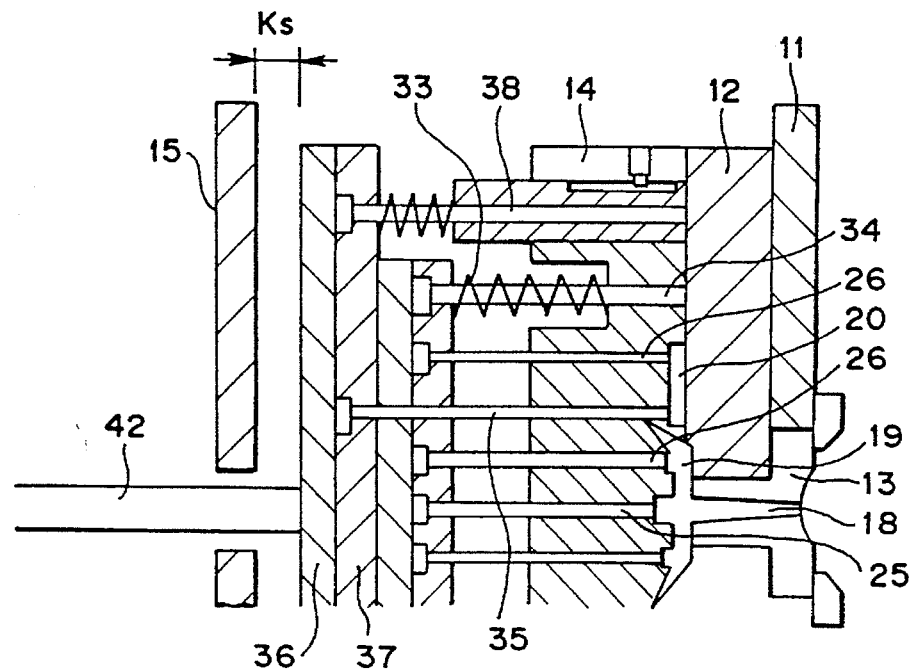
FIG. 3 is a view illustrating the injection molding machine shown in FIG. 2 in the condition in which a pressurizing step has been completed.
Figure 4:
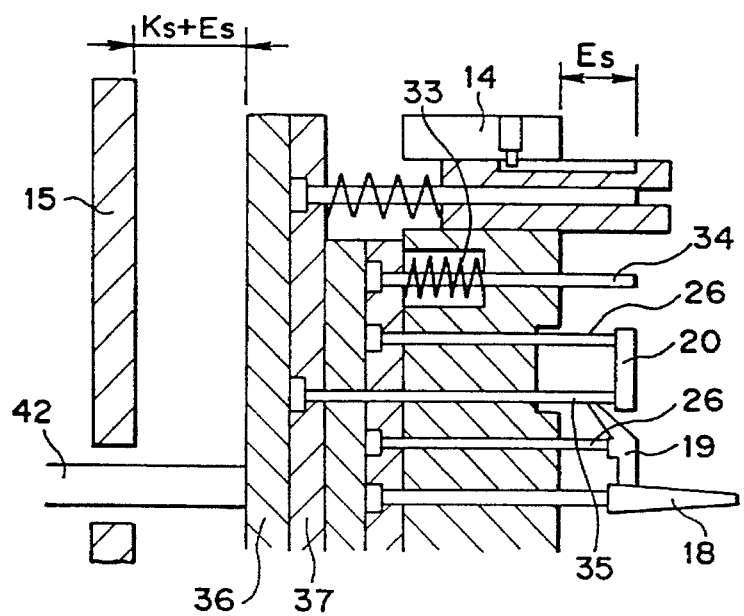
FIG. 4 is a view illustrating the injection molding machine of FIG. 2 in the condition in which an ejecting step has been completed.

Referring to FIG. 2, a locally pressurizing type injection molding machine according to the preferred embodiment of the present invention comprises a stationary die plate 11, and a stationary die 12 mounted on a stationary platen (not shown) with the stationary die plate 11 interposed therebetween. An injection device (not shown) is adapted to advance at an injection step, so that a tip end of an injection nozzle is brought into contact with a spool bush 13 of the stationary die 12.

On the other hand, a movable platen (not shown) is advanced and retracted (i.e., moved laterally as viewed in FIG. 2) by a die opening and closing device (not shown), so that the movable die 14 is brought into and out of contact with the stationary die 12. To this end, the movable die 14 is mounted to the movable platen through a movable die plate 15 and a spacer block (not shown).

A resin injected from the injection nozzle is passed from a sprue 18 through a runner 19 and via a submarine gate 20 into a cavity 21 defined between the stationary and movable dies 12 and 14.

The completion of the injection step is followed by a pressure maintaining step at which the pressure on the resin within the cavity 21 is maintained and, at the same time, the cooling of the resin is started. After a lapse of a given time, the dies 12 and 14 are opened with a molded product (not shown) left on the movable die 13, and the molded product is then ejected by an ejector.

For this purpose, a sprue lock pin 25 and an ejector pin 26 are provided. The sprue lock pin 25 is disposed in an opposed relation to the sprue 18 and serves to retain the molded product on the movable die 14 during opening of the dies. The ejector pin 26 is disposed with its tip end facing the cavity 21, the runner 19 and the like and ejects the molded product from the movable die 14 after opening of the dies.

Head portions formed at trailing ends of the sprue lock pin 25 and the ejector pin 26 are clamped and fixed by ejector plates 31 and 32. The ejector plates 31 and 32 serve to advance the sprue lock pin 25 and the ejector pin 26.

A return spring 33 serves to retract the ejector pin 26, and a return pin 34 guides the ejector plates 31 and 32. As shown in FIG. 2, a gap Es between the ejector plate 32 and a trailing end face of the movable die 14 defines the limit of retraction of the ejector pin 26 and the stroke of the ejector pin 26.

A vibrating/pressurizing pin 35 extends forwardly (i.e., rightwardly as viewed in FIG. 2) through the ejector plates 31 and 32, and faces the cavity 21 so as to operate on the molded product, or faces the gate 20 so as to gate-cut the molded product.

A head portion formed at a trailing end of the vibrating/pressurizing pin 35 is clamped and fixed by vibrating/pressurizing plates 36 and 37.

The vibrating/pressurizing plates 36 and 37 are advanced and retracted by a vibrating/pressurizing cylinder 41 functioning as a vibrating/pressurizing actuator. The vibrating/pressurizing cylinder 41 has a piston rod 42 which extends through the movable die plate 15 to abut against the vibrating/pressurizing plate 36, so that the vibrating/pressurizing pin 35 can be vibrated and advanced by operating the vibrating/pressurizing cylinder 41.

When the ejection operations of the sprue lock pin 25 and the ejector pin 26 have been completed, the closing and clamping of the dies is again effected, and during the clamping of the dies, a floating sleeve 39 is pushed back by the stationary die 12. As a result, the vibrating spring 40 biases the vibrating/pressurizing plate 36 back to its retracted position, i.e., its initial position at initiation of the ejection step.

It should be noted that, instead of the vibrating/pressurizing cylinder 41, an AC servo motor or a DC servo motor can be used as the vibrating/pressuring actuator.

The ejector plates 31 and 32 are disposed in front of the vibrating/pressuring plates 36 and 37 to define a gap Ks therebetween at the limit of retraction of the ejector plates 31 and 32 and at the limit of retraction of the vibrating/pressurizing plates 36 and 37. A plurality of stroke limiting rods 38 are disposed on the vibrating/pressuring plates 36 and 37 at point-symmetric locations with respect to the sprue lock pin 25 and define a gap Ks between the surface of the stationary die 12 and vibrating/pressurizing pin 35 with the dies 12 and 14 closed. The gap Ks corresponds to the effective stroke of the vibrating/pressurizing pin 35.

The floating sleeve 39 is slidably mounted to extend through the movable die 14, and the stroke limiting rod 38 is further slidably disposed within the floating sleeve 39. The vibrating spring 40 is disposed between the floating sleeve 39 and the vibrating/pressurizing plate 37.

The vibrating spring 40 urges the vibrating/pressurizing plates 36 and 37 toward their retracted position and has a spring constant which is a value such that the vibrating/pressurizing plates 36 and 37 can be vibrated at a predetermined frequency of vibration without shuddering. The vibrating spring 40 generates a spring force only with the dies closed, whereas during the opening of the dies, the spring force is released by sliding forward (to the right in FIG. 2) of the floating sleeve 39.

Therefore, for the vibrating step and the pressurizing step, the vibrating/pressurizing plates 36 and 37 are advanced against the spring force of the vibrating spring 40, and for the ejection step, the vibrating/pressurizing plates 36 and 37 are brought into contact with a trailing end face of the ejector plates 31 and 32, and the vibrating/pressurizing plates 36 and 37 and the ejector plates 31 and 32 are advanced against the spring force of the return spring 33. At this time, the floating sleeve 39 is pushed out from the movable die 14 and hence, the spring force of the vibrating spring 40 is released.

The spring constant of the vibrating spring 40 is large and hence, when the vibrating/pressurizing plates 36 and 37 are advanced toward the ejector plates 31 and 32, they could not overcome the biasing force of the vibrating spring 40 but for the floating sleeve 39 which slides out from the movable die 14 to release the spring force of the vibrating spring 40. Therefore, at the ejection step, the vibrating plates 36 and 37 and the ejector plates 31 and 32 advance against only the spring force of the return spring 33.

In order to vibrate and advance the vibrating/pressurizing plates 36 and 37 and to advance the sprue lock pin 25 and the ejector pin 26, a solenoid proportional reduction valve 44 and a solenoid proportional flow control valve 45 are provided. A pulse-like hydraulic pressure or a preset hydraulic pressure is supplied to an oil chamber 41a in the vibrating/pressurizing cylinder 41 by electrically controlling oil discharged from a pump 46 by the solenoid proportional reduction valve 44 and the solenoid proportional flow control valve 45.

At the vibrating step, the pulse-like hydraulic pressure causes the vibrating/pressurizing pin 35 to be gradually advanced while being vibrated, thereby vibrating the resin in a portion of the molded product. In addition, in the pressurizing step, the preset hydraulic pressure allows the vibrating/pressurizing pin 35 to be located at its advance limit position, and acts to maintain the pressure on the resin within the cavity 21. Further, at the ejection step, the preset hydraulic pressure allows the vibrating/pressurizing pin 35 to be advanced, and also allows the sprue lock pin 25 and the ejector pin 26 to be advanced.

It should be noted that oil chamber 41b in the vibrating/pressurizing cylinder 41 serves to retract the vibrating/pressurizing pin 35, the sprue lock pin 25 and the ejector pin 26 to their initial positions.

Figure 5:
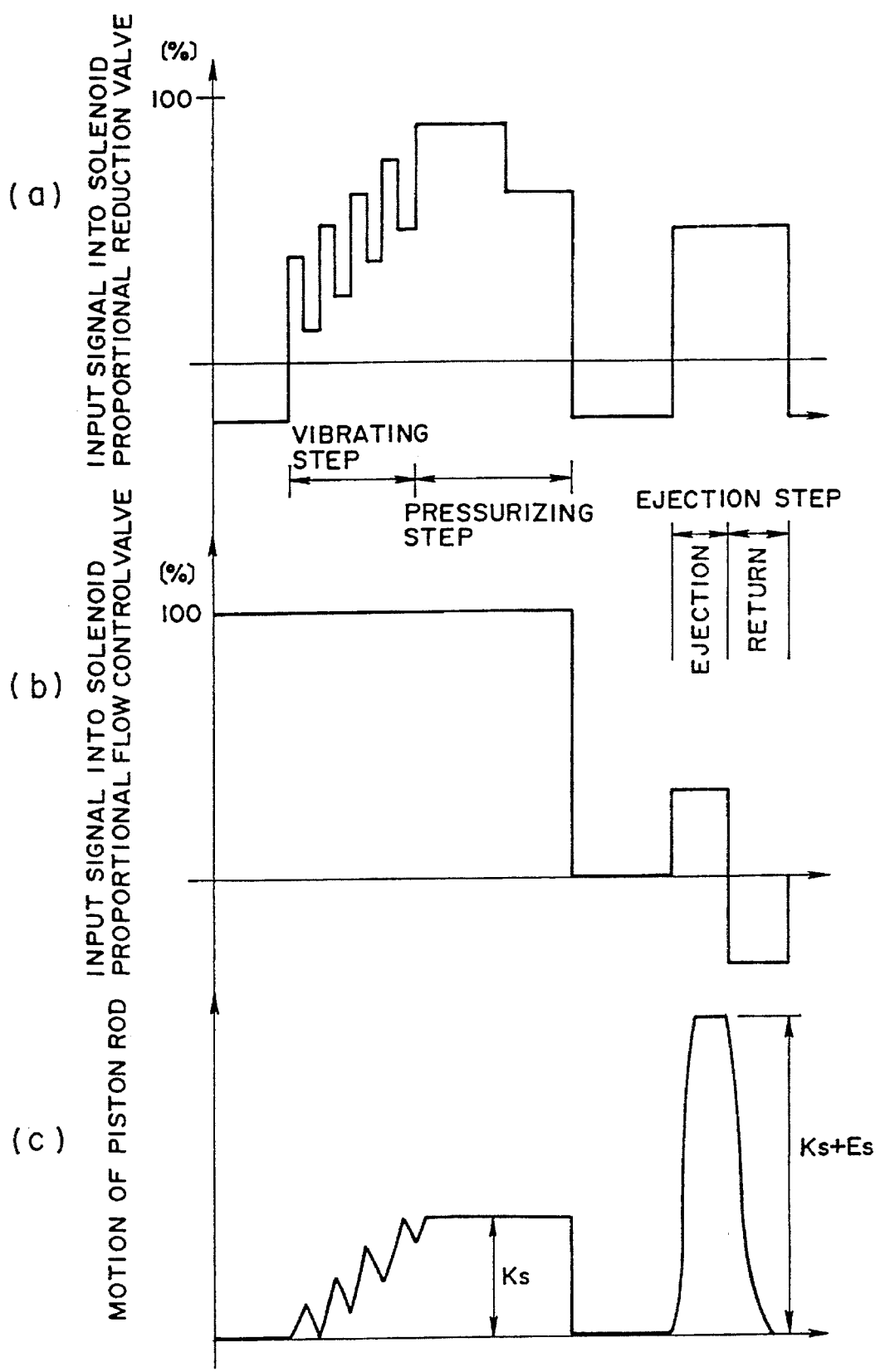
FIG. 5 is a time chart for operations of the injection molding machine shown in FIG. 2.

FIG. 5 is a time chart for operations of the locally pressurizing type injection molding machine according to the present invention. FIG. 5(a) is a time chart for an input signal into the solenoid proportional reduction valve 44 (FIG. 2); FIG. 5(b) is a time chart for an input signal into the solenoid proportional flow control valve 45, and FIG. 5(c) is a time chart for the motion of the piston rod 42.

The control of the vibrating and pressurization can be carried out by the solenoid proportional reduction valve 44. A pulse-like hydraulic pressure output increasing overall while being increased and decreased incrementally, as shown in FIG. 5(a), generates vibration. The vibration frequency and the vibration amplitude of the hydraulic pressure can be set at any level. In the pressurization step, a given hydraulic pressure stepwise decrease as shown in FIG. 5(a) is generated. Even in this case, the amounts of increase and decrease (amplitude) can be set at any level.

Further, in the ejection step, the solenoid proportional reduction valve 44 applies a given hydraulic pressure for ejection on the sprue lock pin 25 and the ejection pin 26.

In the locally pressurizing type injection molding machine having the above-described construction, the vibrating step is started at any time during the injection step. The frequency of vibration at this time is on the order of several to 10 hertz and is controlled in a programmed manner such that it is first increased while being incrementally increased and decreased and finally becomes a constant. In some cases, the pressurizing step can be conducted with the vibrating step being eliminated.

In the pressurizing step, the position of the vibrating/pressurizing plates 36 and 37 is determined by the thrust of the vibrating/pressurizing pin 35 provided by the hydraulic pressure controlled by the solenoid proportional reduction valve 44, the reaction force provided by the vibrating spring 40 and the balance of the pressure on the resin within the cavity 21.

In other words, the position of the vibrating/pressurizing pin 35 can be controlled by controlling the hydraulic pressure. The displacement and vibrational amplitude of the vibrating/pressurizing pin 35 can be also controlled by the increasing and decreasing hydraulic pressure, working on the molded product in resin passages such as the runner 19, the gate 20, the cavity 21 and the like. In this embodiment, the molded product is gate-cut.

Even if the hydraulic pressure within the oil chamber 41a is increased more than necessary at the pressurizing step, the vibrating/pressurizing pin 35 cannot be advanced in excess of the effective stroke (=Ks), because the stroke limiting rod 38 abuts against the trailing end face of the stationary die 12.

When opening the dies, the floating sleeve 39 is pushed out from the movable die 14 by the action of the vibrating spring 40, thus releasing of the spring force of the vibrating spring 40.

The speed of operation of the vibrating/pressurizing cylinder 41 after opening of the dies is controlled by the solenoid proportional flow control valve 45, so that the piston rod 42 is further advanced, thereby causing the sprue lock pin 25 and the ejector pin 26 to be ejected. Thus, the piston rod 42 is advanced by the extent of the gap Es plus the gap Ks.

Although one embodiment of the present invention has been described, it will be understood that the present invention is not limited to the above-described embodiment, and various modifications and variations can be made without departing from the spirit and scope of the invention defined by the accompanying claims.

What is claimed is:

1. A locally pressurizing injection molding machine comprising:

a stationary die, a movable die disposed for movement relative to said stationary die, between open and closed positions, said movable die and said stationary die defining a mold cavity therebetween in said closed position, an ejector pin slidably mounted in said movable die and having a tip end facing said cavity and a trailing end opposite said tip end, an ejector plate fixed to the trailing end of said ejector pin, a vibrating/pressurizing pin slidably mounted in said movable die and said ejector plate and having a tip end facing a resin passage in communication with said mold cavity and a trailing end opposite said tip end, a vibrating/pressurizing plate fixed to the trailing end of said vibrating/pressurizing pin, vibrating/pressurizing actuator means for vibrating said vibrating/pressurizing pin by applying a pulsating pressure against said vibrating/pressurizing plate, for advancing said vibrating/pressurizing plate into contact with said ejector plate and for further advancing said vibrating/pressurizing plate and said ejector plate together toward said dies; and control means for controlling the frequency and amplitude of said pulsating pressure.

2. A locally pressurizing injection molding machine according to claim 1, wherein said vibrating/pressurizing actuator advances the ejector pin into said die cavity through the advancing of the vibrating/pressurizing plate and the ejector plate.

3. A locally pressurizing injection molding machine according to claim 1, further including a vibrating spring, located between said movable die and said vibrating/pressurizing plate, for biasing said vibrating/pressurizing plate in a retracting direction opposed to the direction of said advancing.

4. A locally pressurizing injection molding machine according to claim 3, further including a floating sleeve slidably mounted in said movable die, and wherein said vibrating spring is located between said vibrating/pressurizing plate and said floating sleeve to bias said floating sleeve in the advancing direction.

* * * * *